(12) United States Patent
Chen

(10) Patent No.: US 9,687,770 B2
(45) Date of Patent: Jun. 27, 2017

(54) FLUID FILTERING DEVICE

(71) Applicant: Po-Hui Chen, Changhua County (TW)

(72) Inventor: Po-Hui Chen, Changhua County (TW)

( * ) Notice: Subject to any disclaimer, the term of this patent is extended or adjusted under 35 U.S.C. 154(b) by 177 days.

(21) Appl. No.: 14/718,010

(22) Filed: May 20, 2015

(65) Prior Publication Data

US 2016/0339366 A1    Nov. 24, 2016

(51) Int. Cl.
| | | |
|---|---|---|
| *B01D 46/44* | (2006.01) | |
| *B01D 29/94* | (2006.01) | |
| *B01D 46/00* | (2006.01) | |

(52) U.S. Cl.
CPC ....... *B01D 46/446* (2013.01); *B01D 46/0023* (2013.01); *B01D 46/0039* (2013.01)

(58) Field of Classification Search
None
See application file for complete search history.

(56) References Cited

U.S. PATENT DOCUMENTS

| | | | | |
|---|---|---|---|---|
| 802,714 | A * | 10/1905 | Smith | B01D 39/1623 210/433.1 |
| 2,365,766 | A * | 12/1944 | Levier | B01D 29/21 210/356 |
| 5,399,260 | A * | 3/1995 | Eldredge | C02F 9/005 210/105 |
| 2013/0277285 | A1* | 10/2013 | Borough | B01D 35/143 210/90 |

* cited by examiner

*Primary Examiner* — Terry Cecil
(74) *Attorney, Agent, or Firm* — Bruce Stone LLP; Joseph Bruce

(57) ABSTRACT

A fluid filtering device includes a casing, a fluid filter, an input pipe, an output pipe, an input pressure gauge, an output pressure gauge, and an automated fluid drain controller. The outer input and output ends of the input and output pipes, and the control output end of the automated fluid drain controller are located outside the outer surface of the plates, and the input and output gauge heads are mounted at the outer surface of the plates. By such arrangements, the pressure difference between input and output pressure can be checked readily, so as to maintain the filtering efficiency while reducing the risk of danger.

6 Claims, 5 Drawing Sheets

FLUID FILTERING DEVICE

BACKGROUND OF THE INVENTION

Field of the Invention

The present invention relates to a filter, and more particularly to a fluid filtering device.

Description of the Prior Art

A fluid filtering device is used to remove micro particles, oil and moisture substances from the gas, or to remove the impurities from the liquid.

For example, an air filter for air compressor system (such as the gas for milk products manufacturing, brewing, package and instrument control, semiconductor electronics manufacturing, and medical gas) comprises an air sucking apparatus, a filter connected to the air suck apparatus to filter solid impurities, oil or moisture substances from the air, and an automated drain controller connected to the filter to store or discharge liquid.

Generally, the filtering capacity is decided by the size of the filter, such as 200 ml, 600 ml, 1200 ml, 2000 ml, 3000 ml, etc. During the filtering process, the air input and air output must be maintained within a certain level, otherwise, the filtering efficiency will be adversely affected, and the danger might occur if the pressure difference between the air input and output is overly large. Especially, the large size filter, the pressure difference between the air input and output must be well balanced.

A liquid filtering device also suffers from the same problems that are mentioned above as the air filtering device.

The present invention has arisen to mitigate and/or obviate the afore-described disadvantages.

SUMMARY OF THE INVENTION

The primary objective of the present invention is to provide a fluid filtering device, with which, the pressure difference between input and output pressure can be checked readily, so as to maintain the filtering efficiency while reducing the risk of danger.

Another objective of the present invention is to provide a fluid filtering device, wherein most of the components are disposed in the casing, which reduces the risk of collision caused damage to the components of the filter.

Another objective of the present invention is to provide a fluid filtering device with large filtering capacity.

To achieve the above objective, a fluid filtering device in accordance with the present invention comprises: a casing with a chamber; at least one fluid filter disposed in the chamber of the casing and including a filter space, an input hole in communication with the filter space, and an output hole in communication with the filter space, a filter assembly disposed in the filter space and connected to the output hole, and a discharge hole in communication with the filter space; an input pipe disposed in the casing and including an input passage, an outer input end which is in communication with the input passage and located outside the chamber, and at least one inner input end which is in communication with the input passage and connected to the input hole of the fluid filter; an output pipe disposed in the casing and including an output passage, an outer output end which is in communication with the output passage and located outside the chamber, and at least one inner output end which is in communication with the output passage and connected to the output hole of the fluid filter;

an input pressure gauge including an input gauge head which is disposed on the casing and located outside the chamber, and an input tube which is disposed between and in communication with the input gauge head and the input passage to detect the pressure of the input passage, and the detected pressure of the input passage being displayed on the input gauge head;

an output pressure gauge including an output gauge head which is disposed on the casing and located outside the chamber, and an output tube which is disposed between and in communication with the output gauge head and the output passage to detect the pressure of the output passage, and the detected pressure of the output passage being displayed on the output gauge head; and an automated fluid drain controller being disposed in the chamber of the casing, and including a control input end which is in communication with the discharge hole of the fluid filter, and a control output end which is located outside the chamber.

Preferably, the filter assembly includes plural filter units which are connected one another in series.

Preferably, the chamber is defined by a plurality of plates, the outer input and output ends of the input and output pipes, the control output end of the automated fluid drain controller are located outside an outer surface of the plates, and the input and output gauge heads are mounted at the outer surface of the plates.

Preferably, the input gauge head is adjacent to and at the same level as the outer input end of the input pipe.

Preferably, the output gauge head is adjacent to and at the same level as the outer output end of the output pipe.

Preferably, the input and output pipes are horizontally arranged in the casing.

Preferably, an inner output end of the output pipe is located at the lowest part of the output passage.

Preferably, a collecting pipe which is disposed in the chamber of the casing and provided with a collecting passage, at least one collecting input end which is connected to the discharge hole of the fluid filter, and a collecting output end which is in communication with the collecting passage, and the collecting output end is in communication with and connected to the control input end of the automated fluid drain controller.

Preferably, the collecting pipe is horizontally disposed in the casing, and the collecting output end is located at the lowest part of the collecting passage.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
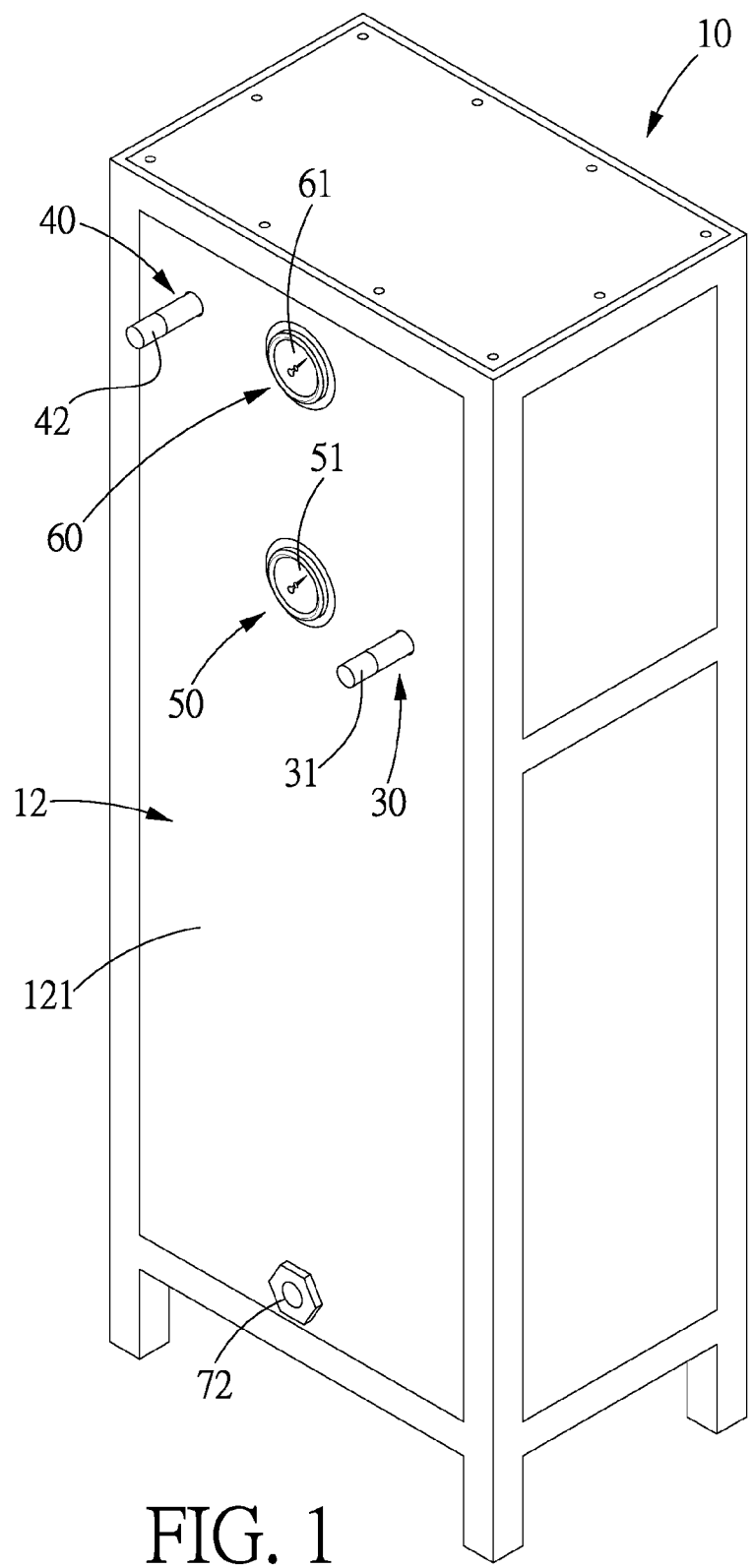
FIG. 1 is a perspective view of a fluid filtering device in accordance with a first embodiment of the present invention.
Figure 2:
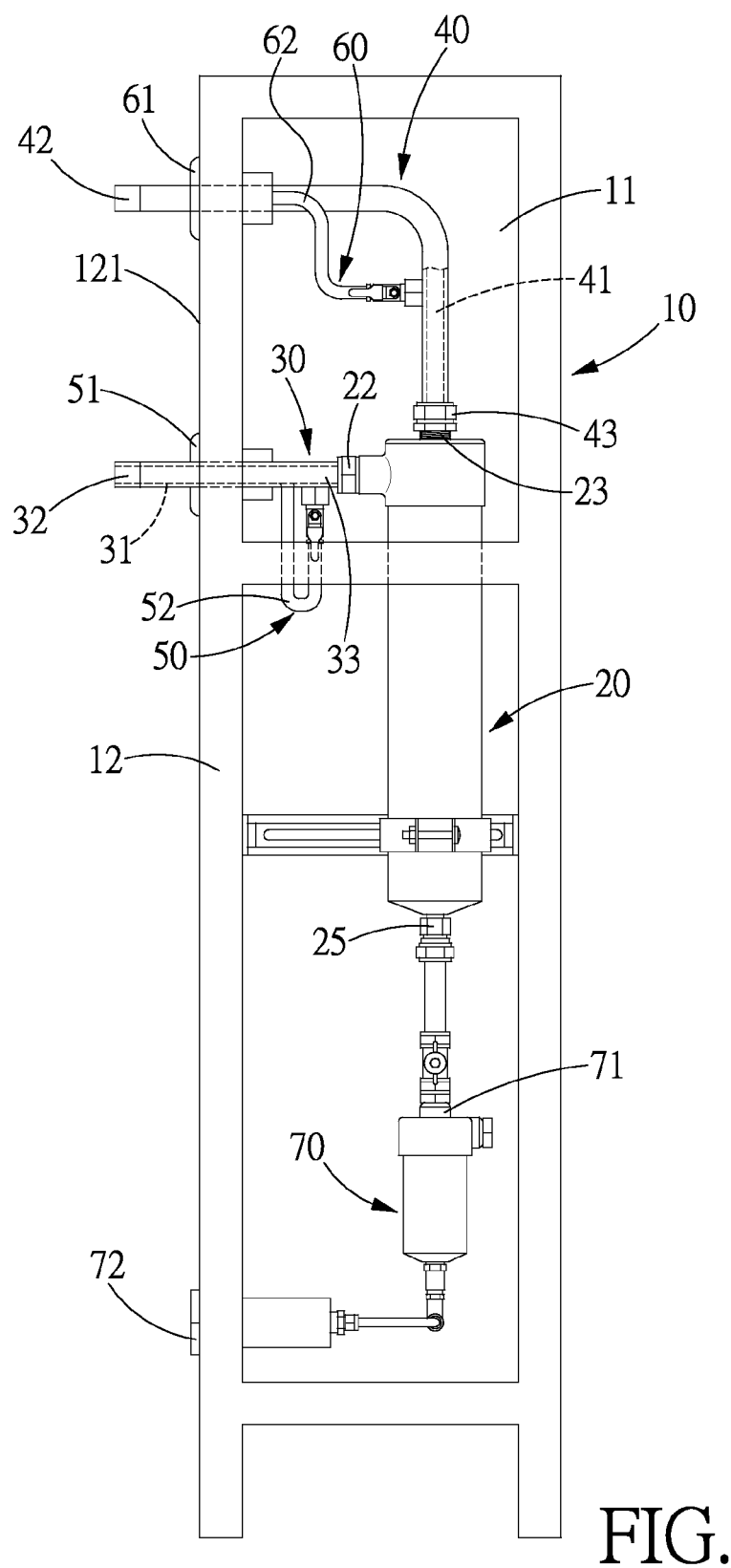
FIG. 2 is a side view of the fluid filtering device in accordance with the first embodiment of the present invention.
Figure 3:
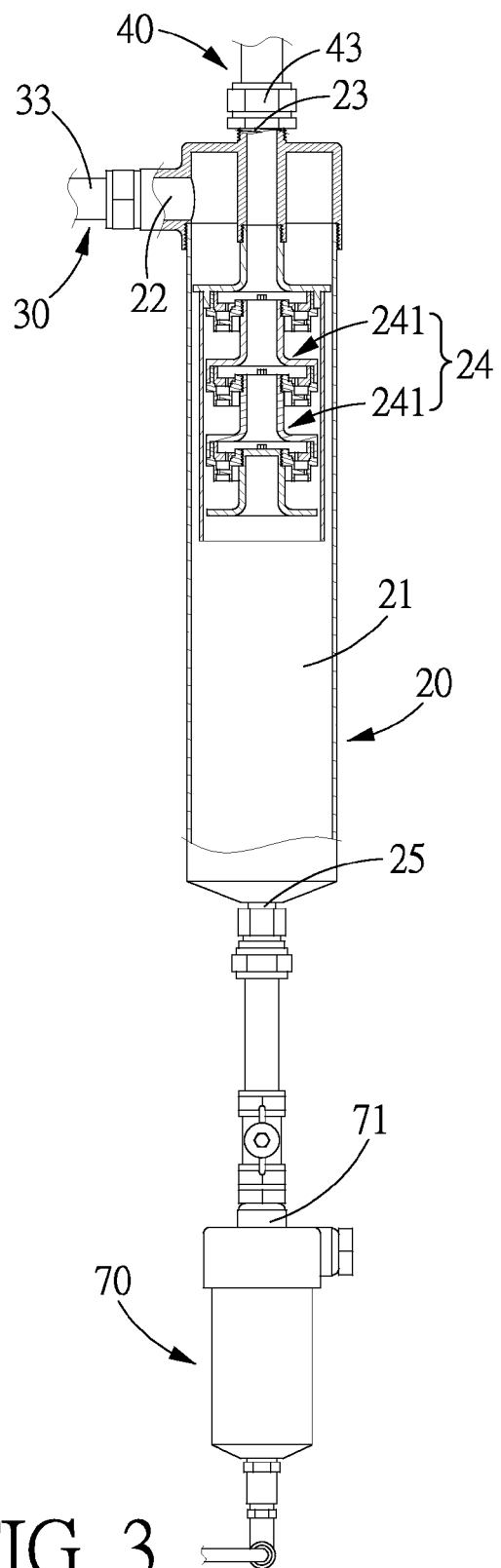
FIG. 3 is a cross sectional view of the fluid filtering device in accordance with the first embodiment of the present invention.

Referring to FIGS. 1-3, a fluid filtering device in accordance with a first embodiment of the present invention comprises: a casing 10, a fluid filter 20, an input pipe 30, an output pipe 40, an input pressure gauge 50, an output pressure gauge 60, and an automated fluid drain controller 70.

The casing 10 includes a chamber 11. In this embodiment, the chamber 11 is a closed space defined by a plurality of plates 12.

The fluid filter 20 is disposed in the chamber 11 of the casing 10 and includes a filter space 21, an input hole 22 in communication with the filter space 21, and an output hole 23 in communication with the filter space 21, a filter assembly 24 disposed in the filter space 21 and connected to the output hole 23, and a discharge hole 25 in communication with the filter space 21. In this embodiment, the filter assembly 24 includes plural filter units 241 which are connected to one another in series, and is capable of filtering without power supply. Since the fluid filter 20 is a conventional structure and is not the key point of the invention, and therefore would not be described here.

The input pipe 30 is disposed in the casing 10 and includes an input passage 31, an outer input end 32 which is in communication with the input passage 31 and located outside the chamber 11, and an inner input end 33 which is in communication with the input passage 31 and connected to the input hole 22 of the fluid filter 20. In this embodiment, the outer input end 32 of the input pipe 30 is located outside an outer surface 121 of one of the plates 12, to feed the fluid to be filtered into the fluid filtering device.

The output pipe 40 is disposed in the casing 10 and includes an output passage 41, an outer output end 42 which is in communication with the output passage 41 and located outside the chamber 11, and an inner output end 43 which is in communication with the output passage 41 and connected to the output hole 23 of the fluid filter 20. In this embodiment, the outer output end 42 of the output pipe 40 is located outside the outer surface 121 of one of the plates 12 to discharge the fluid which has been filtered out of the fluid filtering device.

The input pressure gauge 50 includes an input gauge head 51 which is disposed on the casing 10 and located outside the chamber 11, and an input tube 52 which is disposed between and in communication with the input gauge head 51 and the input passage 31 to detect the pressure of the input passage 31, and the detected pressure value of the input passage 31 is displayed on the input gauge head 51. In this embodiment, the input gauge head 51 is located on the outer surface 121 of one of the plates 12. Besides, the input gauge head 51 is adjacent to and at the same level as the outer input end 32 of the input pipe 30.

The output pressure gauge 60 includes an output gauge head 61 which is disposed on the casing 10 and located outside the chamber 11, and an output tube 62 which is disposed between and in communication with the output gauge head 61 and the output passage 41 to detect the pressure of the output passage 41, and the detected pressure value of the output passage 41 is displayed on the output gauge head 61. In this embodiment, the output gauge head 61 is located on the outer surface 121 of one of the plates 12. Besides, the output gauge head 61 is adjacent to and at the same level as the outer output end 42 of the output pipe 40.

The automated fluid drain controller 70 is disposed in the chamber 11 of the casing 10, and includes a control input end 71 which is in communication with the discharge hole 25 of the fluid filter 20, and a control output end 72 which is located outside the chamber 11. In this embodiment, the control output end 72 is located outside the outer surface 121 of one of the plates 12 to discharge fluid and impurity substance.

What is mentioned above are the relations of the main components of the first embodiment, and the operation and function of the present invention are described as follows.

The input gauge head 51 of the input pressure gauge 50 and the output gauge head 61 of the output pressure gauge 60 are all disposed outside the chamber 11 of the casing 10, namely on the outer surface 121 of the plates 12 of the casing 10. The user can know the pressure inside the input and output pipes 30, 40 by reading the input and output gauge heads 51, 61. With the present invention, the user can check if the pressure difference between the input and output fluids is too large or not, so as to maintain filtering efficiency, and reduce the risk of potential danger.

Besides, the input gauge head 51 is adjacent to and at the same level as the outer input end 32 of the input pipe 30, which allows the user to read the input gauge head 51 more precisely, and prevents the users from mistaking the pressure value displayed on the input gauge head 51 for the pressure of the output pipe 40. Similarly, the output gauge head 61 is located on the outer surface 121 of one of the plates 12. Besides, the output gauge head 61 is adjacent to and at the same level as the outer output end 42 of the output pipe 40, which allows the user to read the output gauge head 61 more precisely, and prevents the users from mistaking the pressure value displayed on the output gauge head 61 for the pressure of the input pipe 30.

On the other hand, when the fluid filtering device in accordance with the present invention is used in an air compressor system, the fluid will change velocity and collide repeatedly with the filter units 241 when flowing through the fluid filter 20, so as to remove moisture, and oily and impurity substances. Therefore, the fluid filter 20 can operate without power, and therefore is energy saving and carbon reducing. Only the automated fluid drain controller 70 will consume a very small amount of electricity when performing the automatic discharge operation.

It is to be noted that the casing 10, the fluid filter 20, the input pipe 30, the output pipe 40, the input pressure gauge 50, the output pressure gauge 60, and the automated fluid drain controller 70 are all disposed on the casing 10, the outer input and output ends 32, 42 of the input and output pipes 30, 40, and the control output end 72 of the automated fluid drain controller 70 are located outside the outer surface 121 of the plates 12, and the input and output gauge heads 51, 61 are mounted at the outer surface 121 of the plates 12, which prevents the casing 10, the fluid filter 20, the input pipe 30, the output pipe 40, the input pressure gauge 50, the output pressure gauge 60, and the automated fluid drain controller 70 from being exposed, consequently reducing the risk of collision caused damage to the components of the filter.

Figure 4:
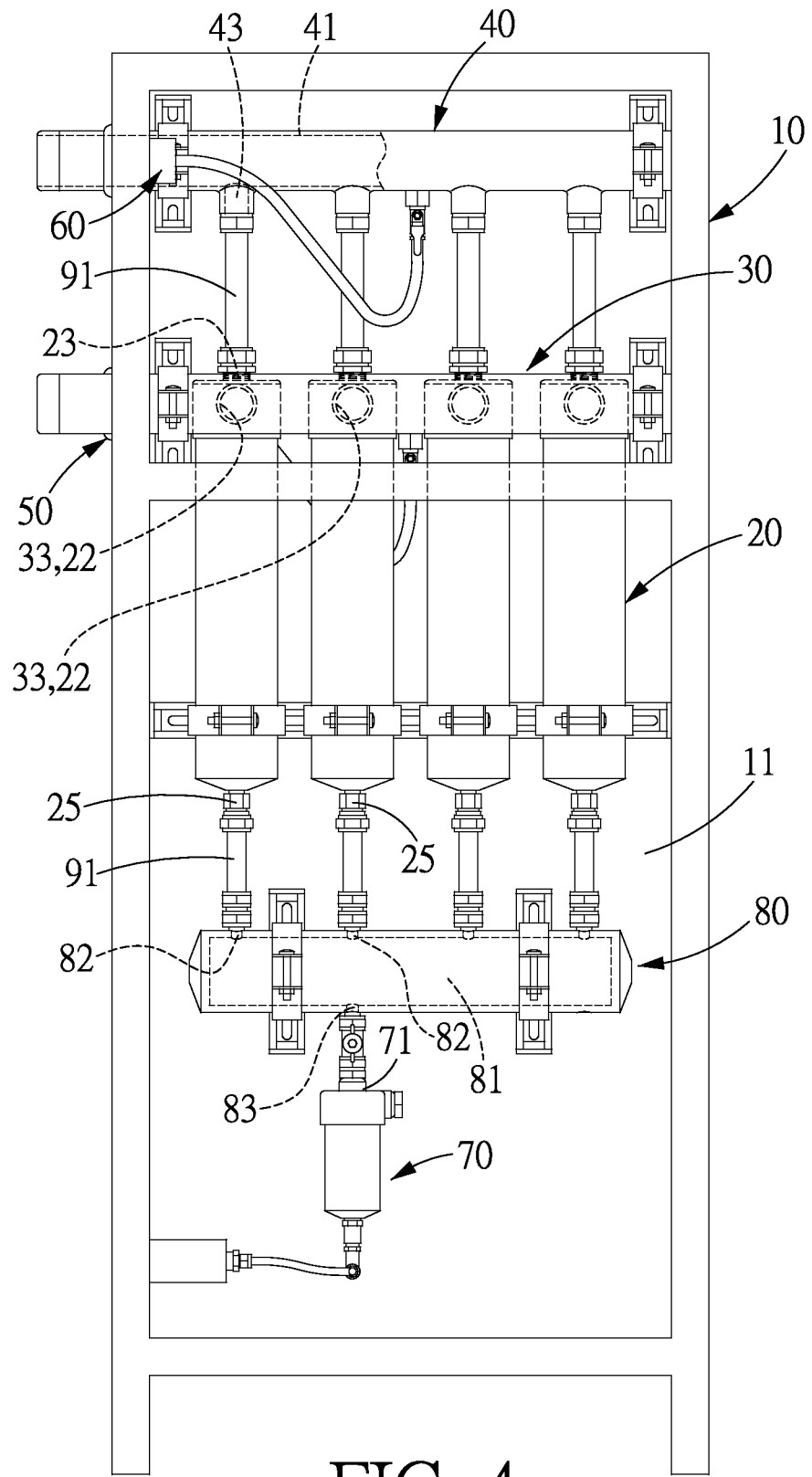
FIG. 4 is a side view of a fluid filtering device in accordance with a second embodiment of the present invention.
Figure 5:
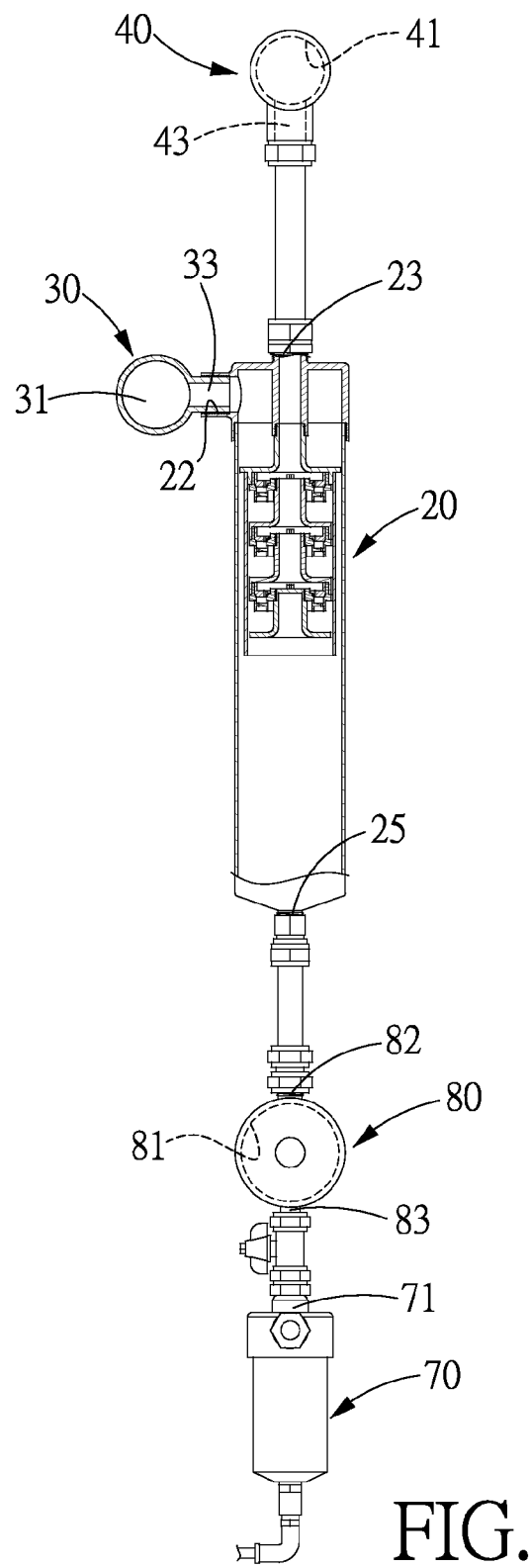
FIG. 5 is a cross sectional view of the fluid filtering device in accordance with the second embodiment of the present invention.

Referring to FIGS. 4 and 5, a fluid filtering device in accordance with a second embodiment of the present invention is similar to the first embodiment, except that:

There are four fluid filters 20 in the casing 10.

The input and output pipes 30, 40 are horizontally arranged in the casing 10, the input pipe 30 has four inner input ends 33 connected to the input holes 22 of the four fluid filters 20, respectively. The output pipe 40 has four inner output ends 43 connected to the output holes 23 of the four fluid filters 20, respectively via four connecting pipes 91, and the inner output ends 43 are located at the lowest part of the output passage 41.

The fluid filtering device further comprises a collecting pipe 80 which is horizontally disposed in the chamber 11 of the casing 10 and provided with a collecting passage 81, four collecting input ends 82 which are connected to the discharge holes 25 of the four fluid filters 20 by four connecting pipes 91, and a collecting output end 83 which is in communication with the collecting passage 81 and located at the lowest part of the collecting passage 81. The collecting output end 83 is in communication with and connected to the control input end 71 of the automated fluid drain controller 70.

The second embodiment further offers the advantages as follows:

First of all, larger filtering capacity: in the casing 10 are disposed the input and output pipes 30, 40, and the four fluid filters 20 which are connected in parallel are disposed between the input and output pipes 30, 40, such arrangements increase filtering capacity, namely, more fluid can be filtered within a given time period. Therefore, the fluid filtering device in accordance with the present invention is capable of filtering fluid at large flow rate. For example, the fluid filtering device can be used to filter the air pollutants from incinerator emission, or cement plant or sand and gravel factory. The fluid filtering device can also be used for small amount fluid filtering, such as the gas for milk products manufacturing, brewing, package and instrument control, semiconductor electronics manufacturing, and medical gas. Besides, the fluid filtering device of the present invention can also be used for liquid filtering to remove impurities from the liquid.

Secondly, the amount of fluid input to and the amount of fluid output from the fluid filtering device of the present invention can be maintained almost at the same level. Since the input and output pipes 30, 40 are horizontally disposed in the casing 10, the inner output ends 43 are disposed at the same side and located at the lowest part of the output passage 41, and the four fluid filters 20 which are connected in parallel are disposed between the input and output pipes 30, 40. Therefore, the input and output pipes 30, 40 can be considered as a pressure balance pipe, and this arrangement almost can balance the amount of fluid input to and the amount of fluid output from the fluid filtering device.

While we have shown and described various embodiments in accordance with the present invention, it is clear to those skilled in the art that further embodiments may be made without departing from the scope of the present invention.

What is claimed is:

1. A fluid filtering device comprising:
    a casing with a chamber;
    at least one fluid filter disposed in the chamber of the casing and including a filter space, an input hole in communication with the filter space, and an output hole in communication with the filter space, a filter assembly disposed in the filter space and connected to the output hole, and a discharge hole in communication with the filter space;
    an input pipe disposed in the casing and including an input passage, an outer input end which is in communication with the input passage and located outside the chamber, and at least one inner input end which is in communication with the input passage and connected to the input hole of the fluid filter;
    an output pipe disposed in the casing and including an output passage, an outer output end which is in communication with the output passage and located outside the chamber, and at least one inner output end which is in communication with the output passage and connected to the output hole of the fluid filter;
    an input pressure gauge including an input gauge head which is disposed on the casing and located outside the chamber, and an input tube which is disposed between and in communication with the input gauge head and the input passage to detect the pressure of the input passage, and the detected pressure of the input passage being displayed on the input gauge head;
    an output pressure gauge including an output gauge head which is disposed on the casing and located outside the chamber, and an output tube which is disposed between and in communication with the output gauge head and the output passage to detect the pressure of the output passage, and the detected pressure of the output passage being displayed on the output gauge head; and
    an automated fluid drain controller being disposed in the chamber of the casing, and including a control input end which is in communication with the discharge hole of the fluid filter, and a control output end which is located outside the chamber;
    wherein the chamber is defined by a plurality of plates, the outer input and output ends of the input and output pipes, the control output end of the automated fluid drain controller, and the input and output gauge heads are all mounted on the same side of the casing on the outer surface of the same plate, the input gauge head is adjacent to and at the same level as the outer input end of the input pipe, the output gauge head is adjacent to and at the same level as the outer output end of the output pipe, the input gauge head and the outer input end of the input pipe are not located at the same level as the output gauge head and the outer output end of the output pipe.

2. The fluid filtering device as claimed in claim 1, wherein the filter assembly includes plural filter units which are connected to one another in series.

3. The fluid filtering device as claimed in claim 1, wherein the input and output pipes are horizontally arranged in the casing.

4. The fluid filtering device as claimed in claim 1, wherein the inner output end of the output pipe is located at a lowest part of the output passage.

5. The fluid filtering device as claimed in claim 1 further comprising a collecting pipe which is disposed in the chamber of the casing and provided with a collecting passage, at least one collecting input end which is connected to the discharge hole of the fluid filter, and a collecting output end which is in communication with the collecting passage, and the collecting output end is in communication with and connected to the control input end of the automated fluid drain controller.

6. The fluid filtering device as claimed in claim 5, wherein the collecting pipe is horizontally disposed in the casing, and the collecting output end is located at the lowest part of the collecting passage.

* * * * *